United States Patent [19]

Blackwell

[11] Patent Number: 5,392,636
[45] Date of Patent: Feb. 28, 1995

[54] APPARATUS AND METHOD FOR LEAK TESTING PRESSURE REGULATED LPG SYSTEMS

[76] Inventor: Robert S. Blackwell, 8277 Iowa Gulch Rd., Morrison, Colo. 80465

[21] Appl. No.: 998,804

[22] Filed: Dec. 30, 1992

[51] Int. Cl.[6] .................... G01M 3/02; G01M 3/36
[52] U.S. Cl. .................... 73/40; 73/40.5 R; 48/193
[58] Field of Search ............ 73/40.5 R, 46, 49.1, 73/40, 744; 48/193

[56] References Cited

U.S. PATENT DOCUMENTS

| | | | |
|---|---|---|---|
| 1,684,864 | 9/1928 | Grohn | 73/744 |
| 2,044,005 | 6/1936 | Klein et al. | 73/744 |
| 2,908,158 | 10/1959 | Jacobsson | 73/46 |
| 4,246,797 | 1/1981 | Myles | 73/744 |
| 4,649,753 | 3/1987 | Goodsmith | 73/865.8 |
| 4,766,762 | 8/1988 | Tsan . | |
| 4,918,968 | 4/1990 | Hoffman . | |
| 4,984,448 | 1/1991 | Jordan et al. . | |

Primary Examiner—Robert Raevis
Assistant Examiner—Daniel S. Larkin
Attorney, Agent, or Firm—Pravel, Hewitt, Kimball & Krieger

[57] ABSTRACT

Apparatus and method for detecting leaks in pressure-regulated gas systems are provided, particularly LPG gas systems. The apparatus allows detection of movement of the diaphragm in a regulator. The method provides for measuring the leakage rate and confirming that the regulator is operating under proper conditions for the test.

11 Claims, 2 Drawing Sheets

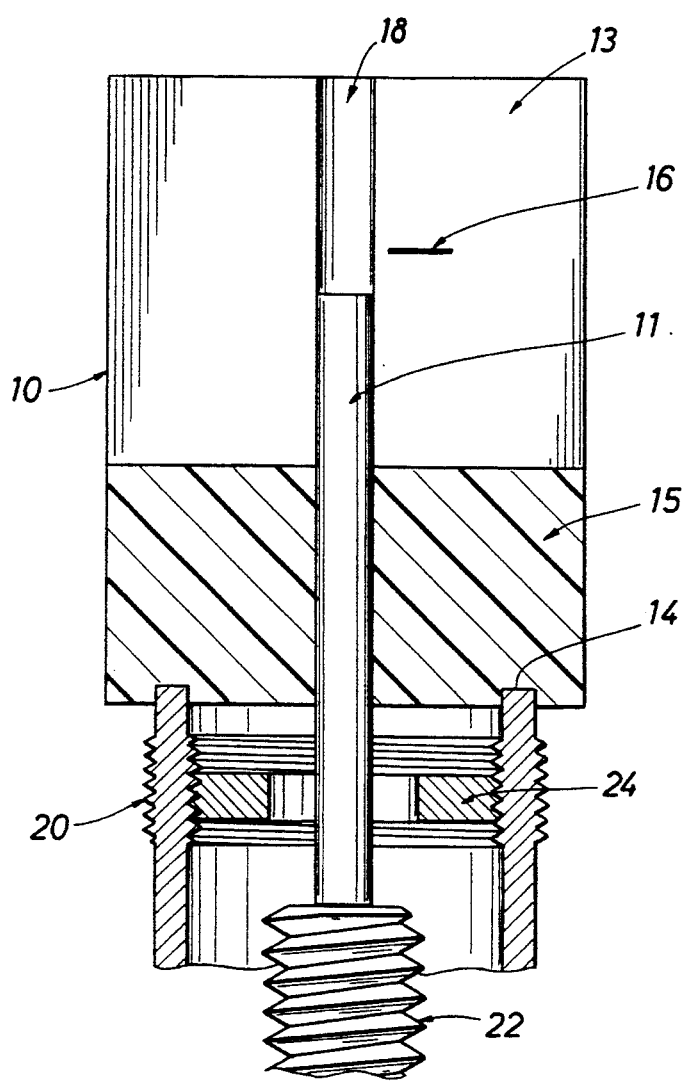
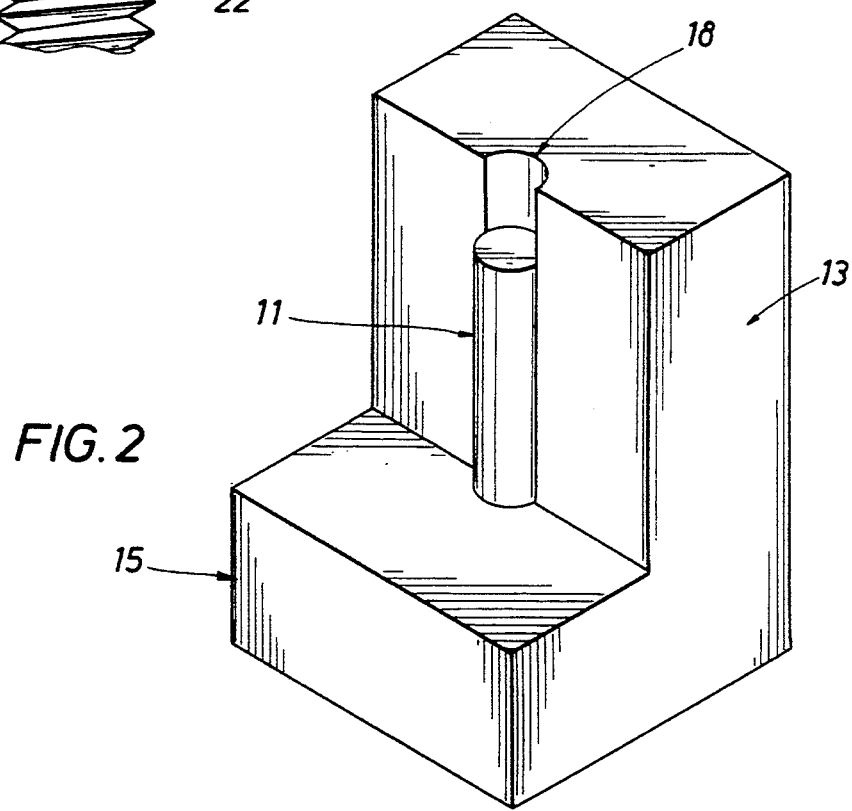
FIG. 1
FIG. 2

FIG. 3
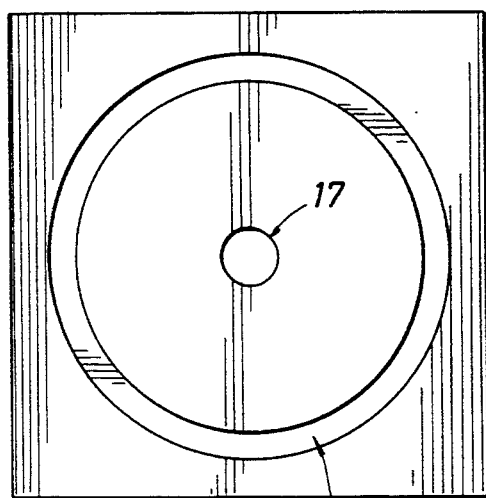
FIG. 4
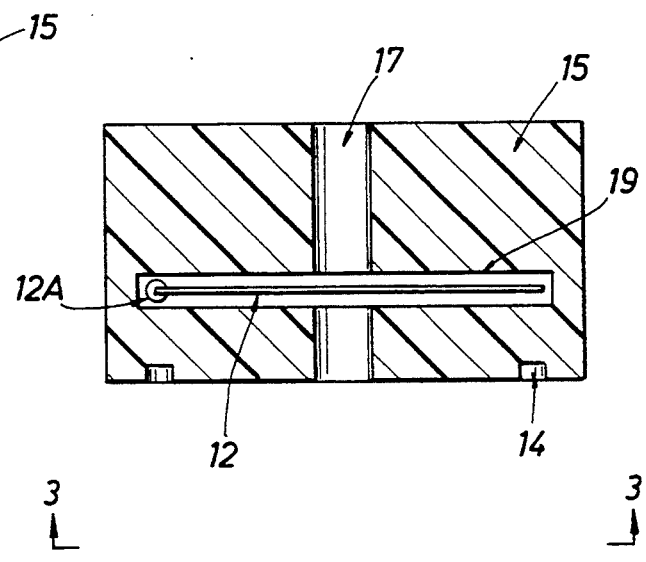
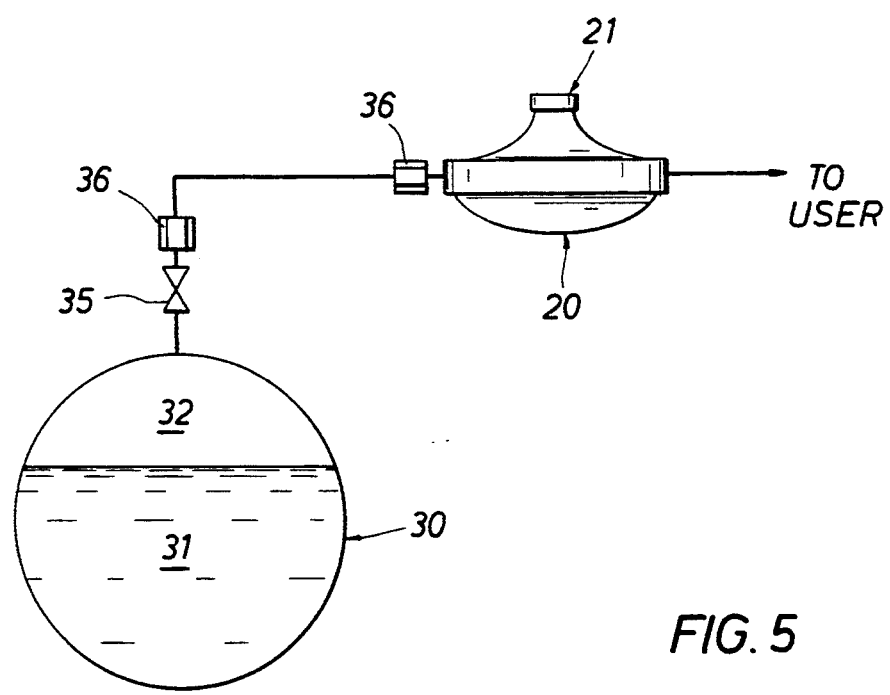
FIG. 5

5,392,636

APPARATUS AND METHOD FOR LEAK TESTING PRESSURE REGULATED LPG SYSTEMS

FIELD OF THE INVENTION

This invention is related to pressure-regulated gas systems, particularly liquefied petroleum gas (LPG) systems. Apparatus and method are provided for detecting leaks in piping or other pressure containment systems receiving or transporting such gas.

BACKGROUND OF THE INVENTION

Liquefied petroleum gas (LPG) is widely used as a source of energy for heating and other uses. Many thousands of homes are heated by LPG. At these homes, the gas is stored on-site in a pressurized tank which contains the liquefied material and its vapor. A pressure regulator is used to decrease and control pressure at a value which is suitable for home piping systems or other uses.

It is very important in the interest of general safety to determine if leaks exist in piping systems carrying such gases, since the range of explosive concentrations in air for such gases extends to low concentrations. One important method for detecting leaks in pipes carrying hydrocarbon gases is the addition of odorant to the gas. Since such odorant can be detected by a person at very low concentrations, odorant is helpful for detecting leaks inside closed structures, but odorant alone does not provide sufficient detection for all leaks.

Another important class of methods for detecting leaks in pipes carrying hydrocarbon gases and other gases is detection of a pressure decline when the system is closed. Testing for leaks in piping systems using pressure decline is a routine procedure. There are several methods within the LPG industry for making leak tests on piping systems. The National Fire Protection Association (NFPA) in their pamphlet No. 54 endorses the following method for checking leakage in piping systems:

"APPENDIX D: SUGGESTED METHOD FOR CHECKING FOR LEAKAGE

"b. Checking for Leakage Not Using a Meter. This can be done in two ways:

"(1) by attaching to an appliance orifice a manometer or equivalent device calibrated so that it can be read in increments of not more than 2 percent of operating system pressure, and momentarily turning on the gas supply and observing the gaging device for pressure drop with the gas supply shut off. No discernible drop in pressure shall occur during a period of 3 minutes; or "(2) by inserting a pressure gage between the container gas shutoff valve and the first regulator in the system, admitting full container pressure to the system and then closing the container shutoff valve. An appliance valve shall then be opened momentarily, dropping the pressure in the system between the first regulator and the container shutoff valve 10 psi. The system shall then be allowed to stand for 10 minutes without showing an increase or a decrease in the pressure gage reading."

This method necessitates the removal of piping segments, plugs or caps and the use of delicate instruments which must be calibrated and carried in shock-resistant containers.

U.S. Pat. Nos. 4,984,448 and 4,918,968 address leak detection in LPG gas systems. These methods both require partial disassembly of the system for insertion and removal of apparatus used in detecting a leak. U.S. Pat. No. 4,766,762 addresses the problem of insertion of apparatus into the piping system by permanently affixing a leak detector on the regulator. However, this method requires the full replacement of the regulator with the new regulator leak detector combination, which is costly. Pressure gages, which can be used to detect leaks in any pressurized system, are relatively expensive and difficult to use in low pressure systems.

There is a long-felt need for apparatus and method to perform a leak test in low pressure gas systems, particularly LPG systems, at the pressure regulator of the system, which does not require going inside a home or other site where the gas is being used, which would require no disassembly of the piping circuit, which operates on all existing hardware without retro-fitting any device, and which is inexpensive and easy to use.

SUMMARY OF THE INVENTION

This invention provides an inexpensive device and method for detecting leaks in pressurized gas systems based on measuring the displacement of a regulator diaphragm. The measurement is made while the regulator is confining gas to the system to be tested for leaks. In one embodiment, the device of this invention is comprised of a body adapted to be placed on a regulator body with the cap of the regulator removed. An elongated member slides through a hole in the body to detect the position of the regulator diaphragm. Preferably, the friction force from sliding is sufficient to support the weight of the elongated member. Means are provided for detecting movement of the regulator diaphragm through registering the position of the elongated member on an extension member of the body. In a preferred embodiment of the method of this invention, with the service valve open and pressure in the piping system, the initial position of the regulator diaphragm is marked on the device, the service valve from the gas supply is closed, gas pressure is vented between the supply and the regulator, after a time the position of the diaphragm is again marked on the device and force is applied to the diaphragm to confirm that the leakage test was performed on the active part of the regulator.

BRIEF DESCRIPTION OF THE DRAWINGS

FIG. 1 is a cut-away view of the apparatus of this invention and of a regulator after the cap of the regulator has been removed.

FIG. 2 is an isometric sketch of the apparatus of this invention showing a preferred embodiment.

FIG. 3 is a bottom view of the apparatus of this invention showing a preferred embodiment.

FIG. 4 is a sketch of a friction-providing mechanism which may be used with this invention.

FIG. 5 is a sketch of a pressure-regulated LPG supply system on which a preferred method of this invention may be applied to detect leaks.

DETAILED DESCRIPTION OF PREFERRED EMBODIMENT

Referring to FIG. 1, a cut-away view of device 10 of this invention is shown on the top of regulator 20, the cap of the regulator having been removed. Elongated member 11 of the device is slidably confined by a hole through base body member 15 of the device. Preferably, the frictional force from member 11 sliding through the base body member 15 of the device is sufficient to support the weight of elongated member 11. This force may arise from selecting the size of the elongated member to the required difference in sizes of the member and the hole, or from other means as described below.

Preferably, the bottom surface of base body member 15 of this device has groove 14. Groove 14 is sized to fit the diameter and wall thickness of the tops of regulators with caps removed. Although different size regulators are in use, the regulators used in LPG service are usually 1.25 to 1.50 inches in diameter. For other types of service, the groove will be sized to fit regulators in use. The groove is cut to insure that slidable elongated member 11 is placed repeatably near the center of stud 22 of the regulator, and groove 14 is so disposed to accomplish this purpose. Other means of locating elongated member over stud 22 may be used, such as a shoulder, projecting sleeve or projecting pins on the bottom surface of base member 15. Holes in the bottom surface of base member 15 (not shown) may be provided such that pins may be removed and adjusted to fit regulator caps of different sizes.

Elongated member 11 is sized to be large enough for rigidity in use and small enough to pass through the hole of regulator pressure adjustment device 24. The length of elongated member 11 should be selected to contact the top of the center stud 22 of a diaphragm in the regulator when it is at its lowest position and to extend to a convenient location on extension member 13 of the body. The material of elongated member 11 may be wood, metal, plastic or any other suitable rigid material.

Although extension member 13 is not required to be so disposed, in FIG. 1 extension member 13 provides groove 18 as an extension of the hole through base member 15. This is a preferred embodiment, but extension member may be disposed such that groove 18 is not provided and extension member 13 provides a surface above base member 15 and in proximity to elongated member 11 when it extends above base member 15. Preferably, extension member 13 is conveniently disposed to allow marking, registering or observing the location of the top of elongated member 11.

FIG. 2 is an isometric view of the device of this invention, showing elongated member 11 enclosed by base member 15 and semi-enclosed by groove 18 in extension member 13. Base member 15 and extension member 13 may be made up of separate pieces joined by screws (not shown), adhesive or other means. In addition, base member 15 may be made up of separate pieces joined by appropriate means. Alternatively, the body of device 10 may be made of one piece. It may be molded from polymeric materials. Preferably, the surface of extension member 13, such as in groove 18, can be marked by simple marking means, such as pencil lead. Alternatively, graduated marks (not shown) may be placed on extension member 13, such as in groove 18, to indicate the position of elongated member 11.

The device is designed so as to register the position of elongated member 11 as it slides through the hole in the body of the device. This registering is easily provided by simply marking, with a pencil or other marking method, on extension member 13 of the device the top of elongated member 11. Such a mark 16, made to indicate a first measurement, is shown in FIG. 1. FIG. 3 shows a bottom view of the device, having groove 14 being adapted to fit on a regulator used in the system to be tested for leaks. Hole 17, adapted for elongated member 11, may be concentric with groove 14. Base member 15 is larger than the opening after removal of the cap of the regulator in the system to be tested, so as to create a constant datum plane for measuring the position of the center stud 22 of a diaphragm, as shown in FIG. 1.

Material of this device should be of sufficient durability to be used in the field. One material which fulfills these requirements is DuPont's CORIAN ®. Other suitable materials include a variety of plastics (such as polyolefins), metal, and wood. The device may have words imprinted thereon. The words may contain instructions for use of the device or a checklist for procedures using the device. The device may also contain advertising logo or words. The words may be formed by labels affixed to the device, by molding the words into the body of the device, or by any other printing method.

FIG. 4 depicts one embodiment of a component of the device which can be used to provide frictional resistance to movement of member 11 through the body of the device. Groove 19 is cut in a part used to make up base member 15. The groove is cut to a depth greater than the depth of hole 17, hole 17 having been formed by temporarily joining two parts of base member 15. Wire 12 is inserted into hole 12A and sized so as to extend into hole 17, wire 12 being bent so as to exert a force on member 11 as it slides to create frictional resistance to movement. Member 11 is put in place and the parts of base member 15 are then joined.

When base member 15 is made up of one piece, the apparatus of FIG. 4 is not suitable and frictional resistance may be provided by a variety of means, such as by a polymeric material pressed against member 11 where it emerges from the body of the device. Alternatively, the body is molded to provide a material pressed against member 11. Alternatively, frictional resistance may be provided by an O-ring, suitably sized to exert the desired amount of frictional resistance, and placed in an O-ring groove made around hole 17 (not shown).

The amount of frictional resistance should be adequate to prevent free fall of member 11 but should be substantially less than the resistance to movement of the diaphragm of a regulator to be used in a leak test. The device of this invention is may be used on single-stage regulators and first-stage regulators.

Referring to FIG. 5, a preferred embodiment of the method of using the device of this invention is illustrated. When an LPG service person uses this device, he will normally fill storage tank 30 with LPG. The storage tank contains liquid 31 and vapor 32. Service valve 35 will be closed during filling. This will result in the pilot lights of users being extinguished and the automatic safety valves to these lights being closed. If the device is to be used at some time in an LPG system when the tank is not being filled, it will still be necessary to first close the service valve, if it is not already closed, if pilot lights are in use. For use of the device of this invention in systems not employing LPG or some other fuel gas, this step will normally not be required.

To perform the leak test, cap 21 of regulator 20 is first removed. Any previous marks on the device of this invention which were made to indicate the position of the elongated member are erased. Service valve 35 is opened and if the sound of flow through the valve is not heard or occurs only briefly, the valve is closed and the test is continued. The device 10 of this invention is placed on regulator 20. Referring again to FIG. 1, elongated member 11 of the device is pressed firmly down to contact stud 22 of the diaphragm in regulator 20 and a first mark is made at the top of the elongated member. With service valve 35 (FIG. 5) closed, POL nut 36 between the tank and the regulator is loosened slightly to allow venting of trapped gas between valve 35 and the regulator. A time is allowed to allow any leak to be observed by movement of the diaphragm. This time is preferably about 1 minute, but may be increased or decreased to vary the sensitivity of the test. The elongated member is again pressed firmly down to Contact the stud of the regulator diaphragm and a second mark is made at the top of elongated member 11. The operator must take care to insure that the force exerted on the elongated member is not sufficient to open the seat of the regulator, which would ruin the test. If elongated member 11 has not moved more than about 1/16", as indicated by the distance between the two marks, the system is normally considered to be leak-free, provided the test is verified. Verification is accomplished by pushing the diaphragm down with enough force to vent the gas backwards through loosened POL nut 36 and noting the position of the top of the elongated member 11 or registering its position by a third mark. The third position of the elongated member should be more than about 3/16" apart from the initial mark, verifying that the test was performed on the active part of the regulator. Then the loosened POL nut 36 is tightened and the regulator cap is replaced.

After an LPG leak test, normal procedures are followed by opening service valve 35, checking the joints and the regulator vent by applying soap solution and making any repairs indicated. A service person will then normally close service valve 35. A record may be left for the user showing results of the tests. If able to enter the site of use of the gas, the service person may open service valve 35 and light any pilot lights.

It will be appreciated that while the present invention has been primarily described with regard to the foregoing embodiments, it should be understood that variations and modifications may be made in the embodiments described herein without departing from the broad inventive concept disclosed above or claimed hereafter.

What is claimed is:

1. Apparatus for detecting leaks in gas systems having pressure regulators with removable caps comprising:
    a body having a base member and an extension member,
    the base member of the body having a hole extending from a bottom surface to a top surface, the hole being disposed within means on the bottom surface for positioning the base member on the regulator with cap removed;
    an elongated member adapted to slidably move through the hole in the base member;
    the extension member of the body being disposed proximate the elongated member when the elongated member is in a position so as to extend from the top surface of the base member; and
    means for applying frictional resistance to the movement of the elongated member through the hole of the base member, the frictional resistance being selected to be large enough to prevent free fall of the elongated member.

2. The apparatus of claim 1 wherein the frictional resistance is produced by a deformable wire pressed against a transverse surface of the elongated member.

3. The apparatus of claim 1 wherein the frictional resistance is produced by the sizing of the elongated member and the hole.

4. The apparatus of claim 1 wherein the frictional resistance arises from a deformable polymeric material contacting the side of the elongated member.

5. The apparatus of claim 4 wherein the deformable polymeric material is in the form of an O-ring.

6. A method of detecting leaks in an LPG system having a service valve and a pressure regulator comprising:
    positioning on the regulator with its cap removed apparatus for detecting movement of the diaphragm of the regulator, the apparatus comprising a body having a base member and an extension member,
    the base member of the body having a hole extending from a bottom surface to a top surface, the hole being disposed within means, on the bottom surface for positioning the base member on the regulator with its cap removed,
    an elongated member adapted to slidably move through the hole in the base member,
    the extension member of the body being disposed proximate the elongated member when the elongated member is in a position so as to extend from the top surface of the base member;
    opening the service valve;
    positioning the elongated member so as to contact the stud of the diaphragm of the regulator and registering a first position of the top of the elongated member on the extension member of the body;
    closing the service valve;
    venting pressure between the service valve and the regulator;
    allowing a time sufficient for a leak in the system to cause movement of the diaphragm;
    determining the movement of the diaphragm by registering a second position of the top of the elongated member with the member in contact with the stud of the diaphragm;
    pressing the elongated member to a third position so as to vent gas from the system and registering the third position of the top of the elongated member; and
    comparing the first, second and third positions of the elongated member to determine if a leak occurred and to verify the test.

7. The method of claim 6 wherein the means on the bottom surface for positioning the base member of the apparatus is a groove, the groove being adapted to fit the top of the pressure regulator with the cap removed.

8. The method of claim 6 wherein the apparatus further comprises means for applying frictional resistance to the movement of the elongated member through the hole of the base member, the frictional resistance being selected to be large enough to prevent free fall of the elongated member.

9. The method of claim 8 wherein the frictional resistance arises from a deformable polymeric material contacting the side of the elongated member.

10. The method of claim 6 wherein the material of the body of the apparatus is a plastic material.

11. A method of detecting leaks in a gas system having a service valve and a pressure regulator comprising:
    positioning on the regulator with its cap removed apparatus for detecting movement of the diaphragm of the regulator, the apparatus comprising a body having a base member and an extension member, the base member of the body having a hole extending from a bottom surface to a top surface, the hole being disposed within means on the bottom surface for positioning the base member on the regulator with its cap removed, an elongated member adapted to slidably move through the hole in the base member, the extension member of the body being disposed proximate the elongated member when the elongated member is in a position so as to extend from the top surface of the base member;

with the service valve open, positioning the elongated member so as to contact the stud of the diaphragm of the regulator and registering a first position of the top of the elongated member on the extension member of the body;

closing the service valve;

venting pressure between the service valve and the regulator;

allowing a time sufficient for a leak in the system to cause movement of the diaphragm;

determining the movement of the diaphragm by registering a second position of the top of the elongated member with the member in contact with the stud of the diaphragm;

pressing the elongated member to a third position so as to vent gas from the system and registering the third position of the top of the elongated member; and comparing the first, second and third positions of the elongated member to determine if a leak occurred and to verify the test.

* * * * *